United States Patent [19]

Foster

[11] Patent Number: 5,996,774
[45] Date of Patent: Dec. 7, 1999

[54] DRIVE BEAM TO DRIVE UNIT CONNECTIONS

[76] Inventor: Raymond Keith Foster, P.O. Box 1, Madras, Oreg. 97741

[21] Appl. No.: 09/322,721

[22] Filed: May 28, 1999

[51] Int. Cl.$^6$ .................................................. B65G 25/00
[52] U.S. Cl. ............................................................ 198/750.6
[58] Field of Search ............................... 198/750.5, 750.6

[56] References Cited

U.S. PATENT DOCUMENTS

| | | | |
|---|---|---|---|
| 4,966,275 | 10/1990 | Hallstrom, Jr. ...................... | 198/750.6 |
| 5,263,573 | 11/1993 | Hallstrom, Jr. ...................... | 198/750.6 |
| 5,332,081 | 7/1994 | Quaeck ................................. | 198/750.6 |
| 5,390,781 | 2/1995 | Foster ................................... | 198/750.6 |

*Primary Examiner*—James R. Bidwell
*Attorney, Agent, or Firm*—Delbert J. Barnard

[57] ABSTRACT

A semi-annular sleeve segment (60) is welded (78) to a drive member (24). Sleeve segment (60) presents abutment surfaces (52, 54) at its ends which upstand from the drive member (24). The abutment surfaces (52, 54) are contiguous inside surface portion (56, 58) of upper clamp parts (30, 32) that are welded to a transverse drive beam (18). The transverse drive beam (18) extends across the drive member (24). Downwardly directed recesses (34) in the upper clamp parts (30, 32) receive upper portions of the drive member (24). Lower clamp parts (36, 38), having upwardly directed recesses (40) are moved upwardly until lower portions of the drive member (24) are within the recesses (40). Bolts (48) are inserted through bolt openings (42) in the lower clamp parts (36, 38) and are then screwed into threaded openings (44) in the upper clamp parts (30, 32). Tightening of the bolts (48) moves the upper and lower clamp parts (30, 32 and 36, 38) together and moves the inner surface portions (56, 58) of the upper clamp parts (30, 32) into positions contiguous the abutment surfaces (52, 54). Movement of the drive member (24) in either direction, will move the leading abutment (52, 54) into driving contact with the contiguous surface (56, 58) on the leading clamp part (30, 32).

20 Claims, 5 Drawing Sheets

DRIVE BEAM TO DRIVE UNIT CONNECTIONS

TECHNICAL FIELD

This invention relates to reciprocating slat conveyors. More particularly, it relates to structure for detachably connecting the movable portion of a drive unit to an associated transverse drive beam.

BACKGROUND OF THE INVENTION

A number of prior art reciprocating slat conveyors are discussed in the "Background Art" section of my co-pending application Ser. No. 09/275,473, filed Mar. 24, 1999 and entitled "Drive Units and Drive Assembly For Reciprocating Slat Conveyors." One of the prior art conveyors is one that is disclosed in my U.S. Pat. No. Re.35,022, granted Aug. 22, 1995, and entitled "Reduced Size Drive/Frame Assembly For A Reciprocating Floor Conveyor." U.S. Pat. No. Re.35,022 relates to a drive assembly composed of "linear hydraulic drive units." The drive units have fixed opposite end portions connected to frame members and a movable center portion connected to one of the transverse drive beams to which the conveyor slats are connected. According to the invention of that patent, the end portions of the drive units are piston components and the movable central portion is a cylinder component. Or, the end portions are cylinder components and the movable central portion is a piston component. This latter arrangement is disclosed in some detail in my U.S. Pat. No. 5,638,943, granted Jun. 17, 1997 and entitled "Drive Assembly For Reciprocating Slat Conveyor." In either style of drive assembly, it is desirable to have the movable portions of the drive units, herein "drive members", detachably connected to the transverse drive beams. This is so the drive units can be disconnected from the drive beams and removed from the installation for servicing. The structure disclosed in U.S. Pat. No. Re.35,022 for detachably connecting the cylinder components to the drive beams comprises a pair of longitudinally spaced apart clamp assemblies, each composed of an upper clamp part that is connected to the drive beam and a removable lower clamp part. Two bolts are provided for connecting each lower clamp part to its upper clamp part. At each connection, one of the upper clamp parts forms an interlock with a structure that has been added to the movable portion of the drive unit. Conveyor assemblies sold by Hallco Manufacturing Co., Inc. of Tillamook, Oreg., under the name Hallco 4000 and Hallco 6000, have a similar connection. The Hallco drive members are piston rods that are connected to the drive beams by longitudinally spaced apart clamp structures composed of upper and lower clamp parts. One of the upper clamp parts interlocks with a structure that has been added onto the drive member.

An object of the present invention is to provide a detachable clamp connection for connecting the drive member to the drive beam in a way that utilizes both upper clamp parts for transmitting the longitudinal drive force from the drive member to the drive beam.

BRIEF SUMMARY OF THE INVENTION

Reciprocating slat conveyors of the present invention are characterized by a pair of abutment surfaces on and upstanding from the drive member of the drive unit. The abutment surfaces are spaced apart axially of the drive member a distance substantially equal to the distance between inside surface portions of upper clamp parts that are attached to a transverse drive beam. Herein, the expression "a distance substantially equal to the distance between the inside surface portions of the upper clamp parts" means a distance that varies from a distance that is slightly smaller than the distance between the inside surface portions of the upper clamp parts to a distance that is slightly larger than the distance between the inside surfaces of the upper clamp parts. In preferred form, the abutment surfaces are spaced apart axially of the drive member a distance slightly greater than the distance between the inside surface portions of the upper clamp parts, so that the abutment surfaces must be force fit into contact with the inside surface portions of the upper clamp parts.

The invention includes a longitudinal drive unit having a reciprocating drive member. A transverse drive beam to which conveyor slats are attached extends over and perpendicular to the drive member. A pair of spaced apart upper clamp parts are connected to the drive beam. Each upper clamp part has a downwardly directed recess sized to receive an upper portion of the drive member. Each upper clamp part further includes an inside surface portion bordering its recess. A pair of complementary lower clamp parts are provided. Each lower clamp part includes upwardly directed recesses sized to receive a lower portion of the drive member. A pair of abutment surfaces are provided on and upstand from the drive member. The abutment surfaces are spaced apart axially of the drive member a distance substantially equal to the distance between the inside surface portions of the upper clamp parts. The upper and lower clamp parts include complementary bolt receiving openings. The bolt receiving openings in the upper clamp parts are internally threaded. The drive member is adapted to be moved into the recesses of the upper clamp parts to place the abutment surfaces that are on the drive member into positions contiguous the inside surface portions of the upper clamp parts. The lower clamp parts are adapted to be positioned below the upper clamp parts, to capture the drive member between the upper and lower clamp parts, in the recesses in the upper and lower clamp parts. This places the bolt receiving openings in the lower clamp parts in alignment with the bolt receiving openings in the upper clamp parts. A plurality of bolts are provided for securing the lower clamp parts to the upper clamp parts with the drive member captured between them. Each bolt is insertable through an opening in a lower clamp part and is threadable into a complementary opening in an upper clamp part. Following this assembly, axial movement of the drive member in either direction will move the leading abutment surface against the contiguous inside surface portion of the leading upper clamp part.

In preferred form, a sleeve segment is provided that is substantially concentric with the drive member. The sleeve segment is connected to the drive member. It has opposite end surfaces that constitute the abutment surfaces. Preferably, the drive member is cylindrical and the sleeve segment is substantially semi-annular.

In preferred form, the drive member has a longitudinally extending neutral axis and the sleeve segment has longitudinal edges that are welded to the drive member substantially within a plane that includes the longitudinal edges and said neutral axis.

The drive beam may be a lipped channel having substantially coplanar lips that are directed downwardly towards the drive member. The lips form an open space between them. The lips have edge portions that project inwardly of the beam from the upper clamp parts. The conveyor includes a sleeve segment attached to the drive member. The sleeve segment has opposite end portions positioned under the projecting edge portions of the lips of the drive beam. It also has opposite end surfaces that constitute the abutment surfaces. The sleeve segment may also include a central portion that projects radially from the drive member into the space between the lips of the drive beam.

Preferably also, the upper clamp parts are welded to the lips of the drive beam. The inside surface portions of the upper clamp parts and the abutment surfaces both lean inwardly. The longitudinal distance between the abutment surfaces is slightly larger than the longitudinal distance between the inside surface portions of the upper clamp parts. As a result, the abutment surfaces on the drive member must be forced radially into positions contiguous the inside surface portions of the upper clamp parts.

These and other advantages, objects, and features will become apparent from the following best mode description, the accompanying drawings, and the claims, all of which are a part of the disclosure of the invention.

BRIEF DESCRIPTION OF THE DRAWINGS

In the drawings, like reference numerals and letters refer to like parts throughout the several views, and.

DETAILED DESCRIPTION OF THE INVENTION

Figure 1:
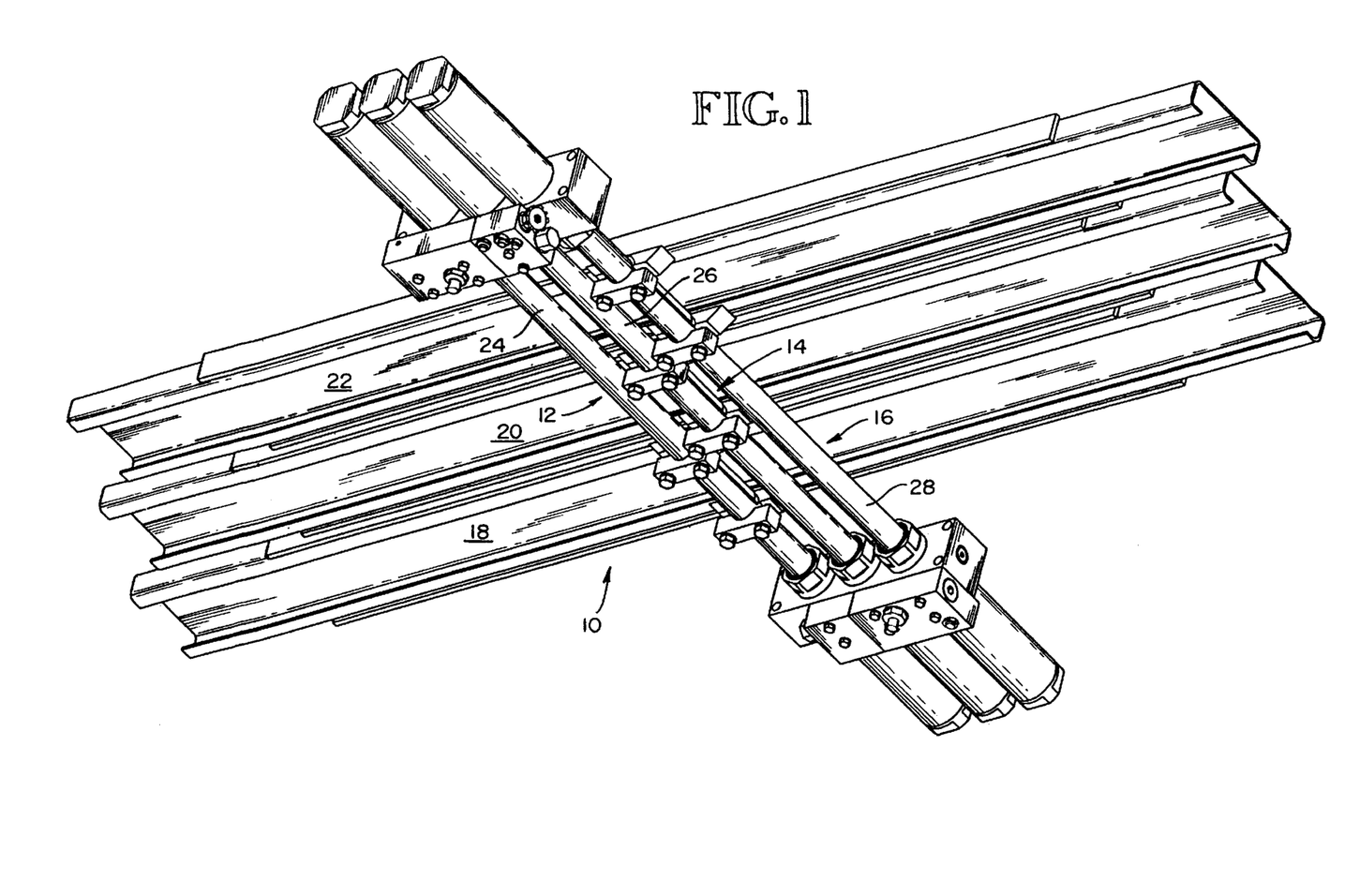
FIG. 1 is a pictorial view of a drive assembly for a reciprocating slat conveyor, looking upwardly from below, towards one end, the bottom on one side of the assembly.
Figure 2:
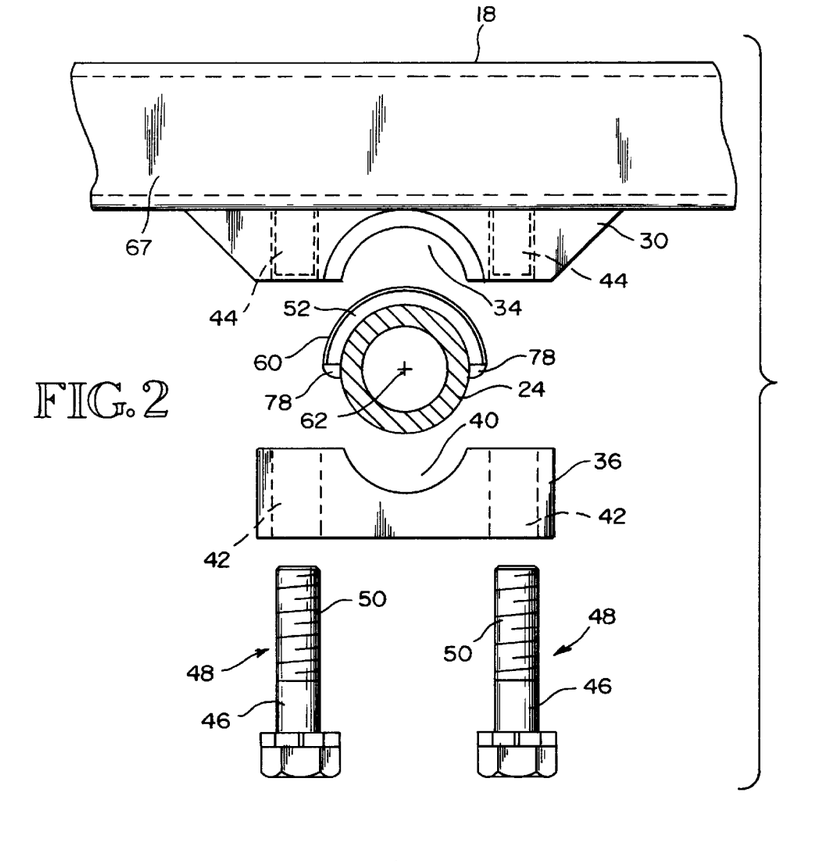
FIG. 2 is a fragmentary cross sectional view taken substantially along line 2—2 of FIG. 4, such view showing the piston rod in section and showing the components of the connection in side elevation.
Figure 3:
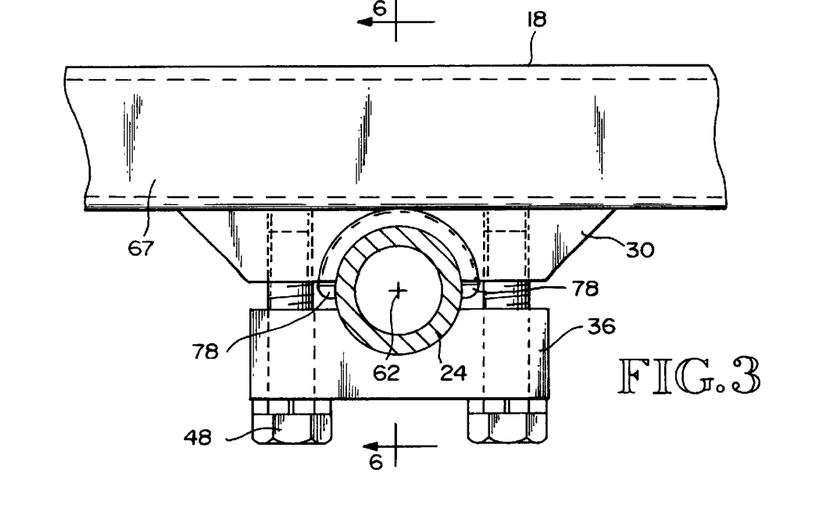
FIG. 3 is a view like FIG. 2, but with the parts assembled.

Principles that constitute the present invention can best be understood by considering an embodiment of the invention and in particular the best mode of the invention that is shown by the drawing. Referring first to FIG. 1, a drive assembly 10 is shown to comprise three linear hydraulic drive units 12, 14, 16. Each drive unit 12, 14, 16 has fixed opposite end portions and a movable center portion. The end portions are secured to frame structure in some suitable manner and the movable center portions are connected to transverse drive beams 18, 20, 22. Conveyor slats (not shown) are connected to the transverse drive beams 18, 20, 22. The relationship of the conveyor slats to the transverse drive beams, and a system of support beams and bearings for the conveyor slats are disclosed by my U.S. Pat. No. 4,823,938, granted Apr. 25, 1989, and entitled "Improved Drive System For A Reciprocating Floor Conveyor." The contents of this patent are herein incorporated herein by this specific reference.

The movable center portions of the drive units 12, 14, 16 are herein referred to as "reciprocating drive members." In the illustrated embodiment they are piston rods 24, 26, 28. They are connected to the drive beams by use of the connection structure of the present invention that will hereinafter be described in some detail. The rest of the drive assembly is described in some detail in my co-pending application Ser. No. 09/275,473, filed Mar. 24, 1999 and entitled, "Drive Units And Drive Assembly For A Reciprocating Slat Conveyor." This application is hereby incorporated herein by this specific reference.

All three connections are the same. Accordingly, only one of the connections is illustrated and described in detail. It is the connection between piston rod 24 and drive beam 18. It is to be understood, however, that the connection between the piston rod 26 and drive beam 20 and the connection between piston rod 28 and drive beam 22 are the same as the connection between piston rod 24 and drive beam 18 that is illustrated by FIGS. 2–8 and is described in relationship to such figures.

As shown by FIGS. 1–6, the transverse drive beam 18 extends over and perpendicular to the drive member 24. The detachable connection comprises a pair of spaced apart upper clamp parts 30, 32, welded or otherwise, connected to the drive beam 18. Each upper clamp part 30, 32 includes a downwardly directed recess 34 (FIG. 2) sized to receive an upper portion of the drive member 24. Each connection also includes a pair of complementary lower clamp parts 36, 38, each including an upwardly directed recess 40 (FIG. 2) sized to receive a lower portion of the drive member 24. The lower clamp parts 36, 38 include bolt receiving openings 42 that are alignable with bolt receiving openings 44 in the upper clamp parts 30, 32. The openings 42 are sized to freely pass the shanks 46 of bolts 48 which are provided to connect the lower clamp parts 36, 38 to the upper clamp parts 30, 32. The openings 44 are threaded to receive threaded end portions 50 of the bolts 48.

According to the invention, a pair of abutment surfaces 52, 54 are provided on and upstand from the drive member 24. The abutment surfaces 52, 54 are spaced apart axially of the drive member a distance substantially equal to the distance between the inside surface portions 56, 58 of the upper clamp parts 30, 32. In the illustrated embodiment, the abutment surfaces 52, 54 are opposite end surfaces of a single member 60 that is attached to the drive member 24. Drive member 24 is circular in cross-section. The member 60 is a sleeve segment that is substantially semi-annular. It has an inside curvature that substantially matches the outside curvature of the drive member 24. As shown by FIGS. 1–5, the member 60 has lower side edges that are substantially at the same level as the geometric axis of the drive member 24, designated 62 in FIGS. 2–5.

The abutment surfaces 52, 54 and the clamp surfaces 56, 58 extend crosswise of the direction of applied force. They serve to couple the drive beam to the drive member so that the two will move together. Stated another way, the contact of the abutment surfaces 52, 54 with the clamp surfaces 56, 58 couples the drive beams 18, 20, 22 and the drive members 24, 26, 28 in the direction of applied force. The clamps restrain the drive members 24, 26, 28 against horizontal and vertical movement relative to the drive beams 18, 20, 22.

Figure 4:
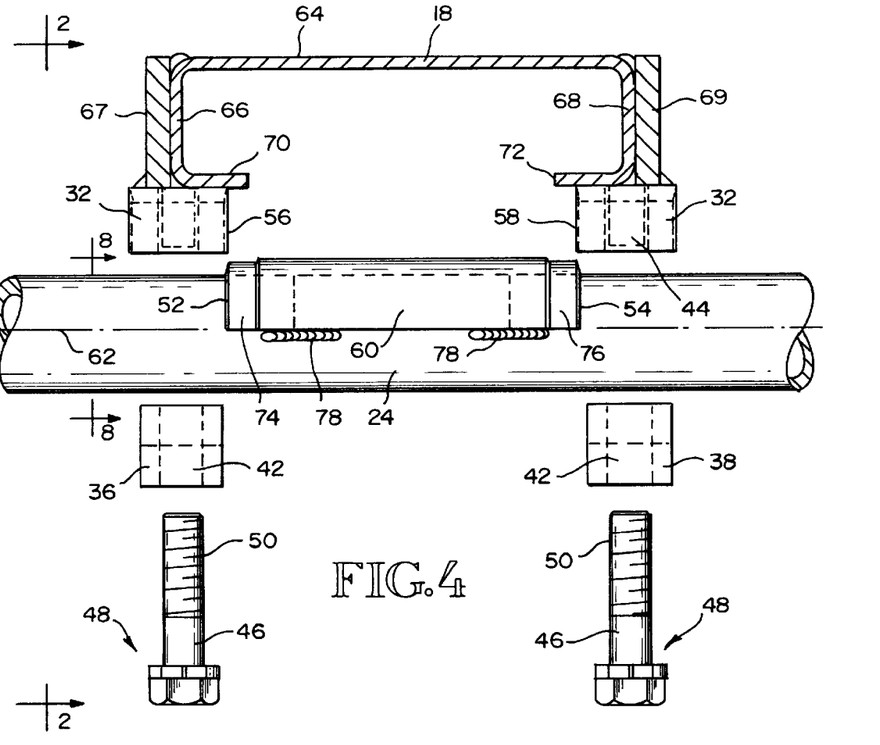
FIG. 4 is an exploded side elevational view, with the opposite end portions of the piston component omitted.
Figure 5:
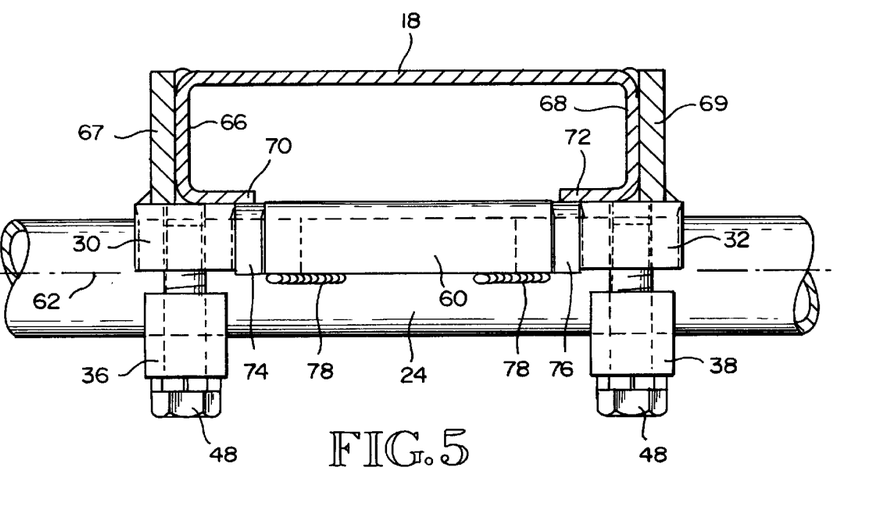
FIG. 5 is a view like FIG. 4, but showing the components of the connection assembled.
Figure 6:
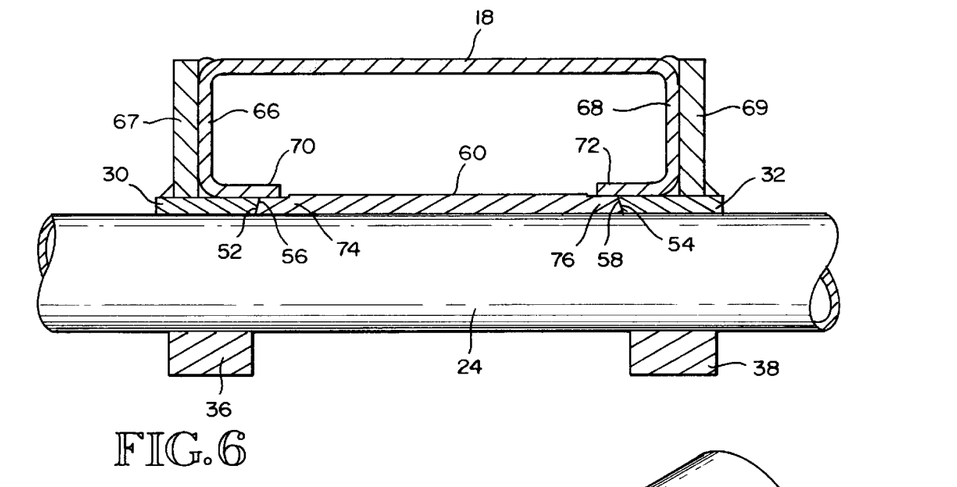
FIG. 6 is a longitudinal sectional view taken substantially along line 6—6 of FIG. 3, with the piston rod portion being shown in side elevation.

Referring to FIGS. 1, 4 and 5, the drive beams 18, 20, 22 are preferably lipped channels. They comprise an upper wall 64, a pair of opposite sidewalls 66, 68 and a pair of coplanar lips 70, 72 that project laterally inwardly from the sidewalls 66, 68. Stiffener bars 74, 76 are positioned outwardly of the sidewalls 66, 62 and are welded to the drive beam generally where the sidewalls 66, 68 and the reinforcement strips 74, 76 meet, top and bottom of the drive beams 18, 20, 22. The upper clamp parts 30, 32 are welded to the lips 70, 72 and the reinforcement strips 74, 76.

As shown by FIGS. 4 and 5 the lips 70, 72 have inner portions that project beyond the inner boundaries 56, 58 of the upper clamp parts 30, 32. The opposite end portions of the member 60 are reduced in radial dimension below the projecting portions of the lips 70, 72. This allows the lips 70, 72 to extend over the end portions 74, 76 of the member 60. This is best shown in FIG. 5. Lips 70 and 72 do not contact surfaces 74 and 76 respectively in the installed position. Surfaces 74 and 76 are machined so as to allow clearance for lips 70 and 72. This clearance assures that the downwardly directed recesses in clamps 30 and 32 will "mate tight" against member 24 and surfaces 56 and 58 will "mate tight" against surfaces 52 and 54 without prior contact of lips 70 and 72 against surfaces 74 and 76.

In the illustrated embodiment, the inside surface portions 56, 58 of the upper clamp parts 30, 32 and the abutment surfaces 52, 54, both lean inwardly. Also, the longitudinal distance between the abutment surfaces 52, 54 may be slightly larger than the longitudinal distance between the inside portions 56, 58 of the upper clamp parts 30, 32. When the bolts 48 are tightened, the abutment surfaces 52, 54 slide upwardly along the clamp surfaces 56, 58, causing the upper clamp parts 30, 32 to spread apart slightly, if necessary. This is what is termed an "interference" fit. However, all that is necessary is that the distance between the abutment surfaces 52, 54 be substantially equal to the distance between the clamp surfaces 56, 58. The distances are "substantially equal" when the distance between clamp surfaces 56, 58 is slightly larger than the distance between the abutment surfaces 52, 54, providing what is known as a "clearance fit." "Substantially equal" also includes an exact or "net" fit.

Figures 7, 8:
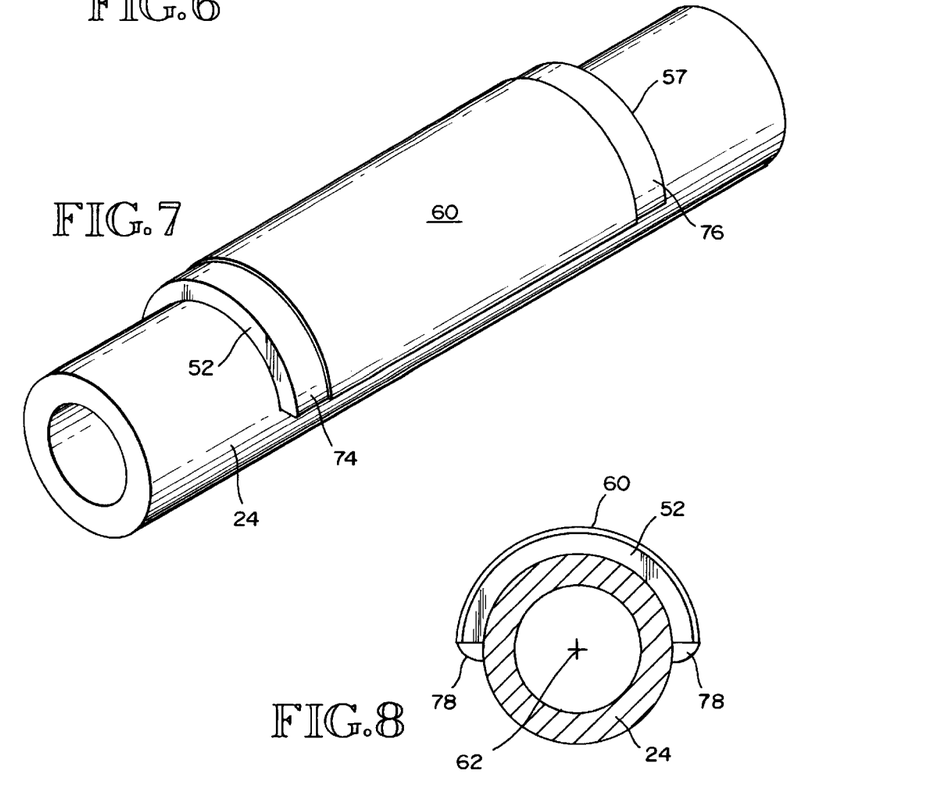
FIG. 7 is a fragmentary pictorial view in the region of where the annular segment is welded to the drive member, taken from above and looking towards the top and one side of the drive member and the semi-annular segment and towards one end of the semi-annular segment.
FIG. 8 is a cross sectional view taken substantially along line 8—8 of FIG. 4.

The drive member 24 is a beam that is loaded by material on the conveyor, wanting to deflect the beam or member 24 downwardly. The center axis 62 is also the neutral axis of the beam. In the illustrated embodiment, the member 60 is welded to the drive member 24 substantially at the level of the neutral axis. Weld beads 78 are provided between lower edge portions of the member 60 and the drive member 24. Similar weld beads 78 are provided on the opposite side of member 60, as shown by FIG. 8. When a beam is deflected downwardly, its lower surface increases in length and its upper surface decreases in length. Its length at the neutral axis remains substantially constant. It is desirable to place the welds 78 at the level of the neutral axis so that they will be subjected to a minimum amount of lengthening or shortening in response to bending of the drive member 24.

The assembly of the connections will now be described. In a new construction, the drive beam 18 can be positioned on the drive member 24 while the drive member 24 is in a supported position. A downward force will be imposed on the drive beam 18 to at least start its downward movement relative to the drive member 14. Then, the lower clamp parts 36, 38 are moved upwardly into positions below the upper clamp parts 30, 32. The bolt openings 42 in the lower clamp parts 36, 38 are aligned with the bolt openings 44 in the upper clamp parts 30, 32. Then, the bolts 48 are inserted first through the openings 42 and then into the openings 44. The threads 50 will easily slide through the openings 42 but the bolts 48 must be rotated in order to mate them with the threads in the openings 44. Rotation of the bolts 48 will move the upper and lower clamp parts 30, 36 and 32, 38 together and will move the inner surface portions 56, 58 on the upper clamp parts 30, 32 downwardly into contiguous contact with the abutment surfaces 52, 54.

When the drive assembly is installed in a trailer, or some other installation, the assembly is essentially the same except that the drive member 24 is moved upwardly towards the drive beam 18. The drive 18 is in the installation and is connected to the conveyor slats. The drive units are movable. They are moved upwardly to place the drive members into the downwardly directed recesses 34 of the upper clamp parts 30, 32. When it is desired to remove one or more of the drive units, for purposes of making a repair or some other purpose, all that is necessary is for the bolts 48 to be removed along with additional bolts that connect to drive units to a mounting frame. This permits the drive units 12, 14, 16 to drop vertically downwardly away from the drive beam that will stay with the installation.

Figure 9:
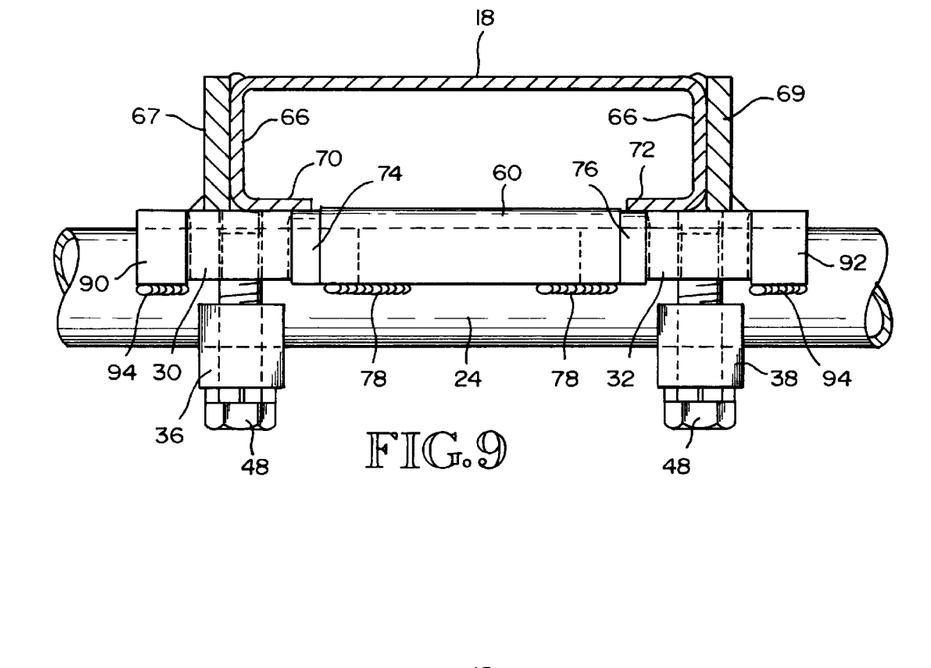
FIG. 9 is a view like FIG. 5, but showing two additional sleeve segments connected to the drive member axially outwardly of the upper clamp members.
Figure 10:
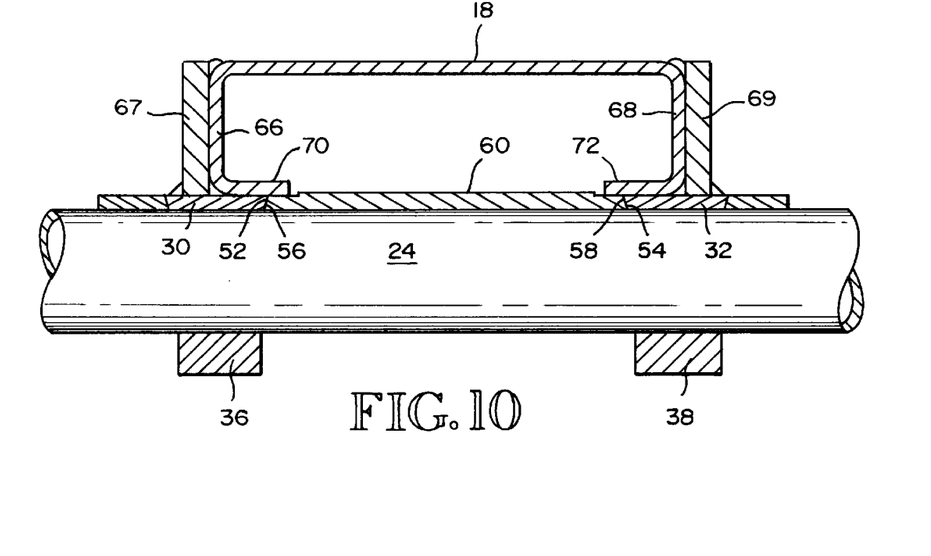
FIG. 10 is a view like FIG. 6, but of the connection shown by FIG. 9.

FIGS. 9 and 10 show a modified embodiment that is like the embodiment of FIGS. 1–8 with the exception that it includes a pair of additional sleeve segments 90, 92 that are welded to the drive member 24 by welds 94. Preferably, each sleeve segment 90, 92 is semi-annular in shape and it is welded to the sides of the drive member 74 substantially at the level of the neutral axis. As shown in FIG. 10, the end surfaces where the sleeve segments 90, 92 contact the upper clamp parts 30, 32 are preferably sloping surfaces like surfaces 52, 56 and 54, 58. In this embodiment, both the leading abutment surface on member 60 and the leading end surface on the trailing sleeve segment 90, 92 function to transmit the drive force to the upper clamp parts.

The illustrated embodiment is an example of the present invention and, therefore, is non-limitive. It is to be understood that changes in the particular structure, materials and features of the invention may be made without departing from the spirit and scope of the invention. Therefore, it is my intention that my patent rights not be limited by the particular embodiment that is illustrated and described herein, but rather is to be determined by the following claims, interpreted according to accepted doctrines of claim interpretation, including use of the doctrine of equivalents.

What is claimed is:

1. A reciprocating slat conveyor, comprising:

a longitudinal drive unit having a reciprocating drive member;

a transverse drive beam to which conveyor slats are attached, extending over and perpendicular to the drive member;

a pair of spaced apart upper clamp parts connected to the drive beam, each having a downwardly directed recess sized to receive an upper portion of the drive member, and further having an inside surface portion bordering its recess;

a pair of complementary lower clamp parts, each lower clamp part including upwardly directed recesses sized to receive a lower portion of the drive member;

a pair of abutment surfaces on and upstanding from the drive member and spaced apart axially of the drive member a distance substantially equal to the distance between the inside surface portions of the upper clamp parts;

said upper and lower clamp parts including complementary bolt receiving openings and said bolt receiving openings in the upper clamp parts being internally threaded;

said drive member being adapted to be moved into the recesses of the upper clamp parts to place the abutment surfaces on the drive member into positions contiguous the inside surface portions of the upper clamp parts;

said lower clamp parts being adapted to be positioned below the upper clamp parts, to capture the drive member between the upper and lower clamp parts, in the recesses in the upper and lower clamp parts, and place the bolt receiving openings in the lower clamp parts in alignment with the bolt receiving openings in the upper clamp parts; and a plurality of bolts, for securing the lower clamp parts to the upper clamp parts with the drive member captured between them, each said bolt being insertable through an opening in a lower clamp part and threadable into a complementary opening in an upper clamp part, whereby following assembly, axial movement of the drive member in either direction will move the leading abutment surface against the contiguous inside surface portion of the leading upper clamp part.

2. The conveyor of claim 1, comprising a sleeve segment substantially concentric with the drive member, said sleeve segment being connected to the drive member and having opposite end surfaces that constitute said abutment surfaces.

3. The conveyor of claim 2, wherein said drive member is cylindrical and said sleeve segment is substantially semi-annular.

4. The conveyor of claim 3, wherein said drive member has a longitudinally extending neutral axis and said sleeve segment has longitudinal edges that are welded to the drive member substantially within a plane that includes said longitudinal edges and said neutral axis.

5. The connector of claim 1, wherein said drive unit comprises fixed opposite end portions that are cylinder components and said reciprocating drive member is a piston rod portion of a piston component.

6. The conveyor of claim 1, wherein said drive beam is a lipped channel having substantially coplanar lips that are directed downwardly towards the drive member, said lips forming an open space between them, said lips having inner edge portions that project inwardly of the beam from the upper clamp parts, and wherein said conveyor includes a sleeve segment attached to the drive member, said sleeve segment having opposite end portions positioned under the projecting lips of the drive beam and opposite end surfaces that constitute the abutment surfaces.

7. The conveyor of claim 6, wherein the sleeve segment includes a center portion that projects radially from the drive member into the space between the lips of the drive beam.

8. The conveyor of claim 7, wherein the upper clamp parts are welded to the lips of the drive beam.

9. The conveyor of claim 1, wherein the inside surface portions of the upper clamp parts and the abutment surfaces both lean inwardly, and wherein the longitudinal distance between the abutment surfaces is slightly larger than the longitudinal distance between the inside surface portions of the upper clamp parts, whereby the abutment surfaces on the drive member must be forced into positions contiguous the inside surface portions of the upper clamp parts.

10. The conveyor of claim 9, wherein the drive beam is a lipped channel having coplanar lips that face the drive member and a space formed by and between the lips, wherein the upper clamp parts are secured to the lips of the drive member, and wherein the movement of the abutment surfaces into positions contiguous the inside surface portions of the upper clamp parts causes a slight widening of the space between the lips to accommodate the distance between the abutment surfaces.

11. The conveyor of claim 10, comprising a sleeve segment substantially concentric with the drive member, said sleeve segment being connected to the drive member and having opposite ends that constitute said abutment surfaces.

12. The conveyor of claim 9, comprising a sleeve segment substantially concentric with the drive member, said sleeve segment being connected to the drive member and having opposite ends that constitute said abutment surfaces.

13. The conveyor of claim 11, wherein said drive member is cylindrical and said sleeve segment is substantially semi-annular.

14. The conveyor of claim 12, wherein said drive member is cylindrical and said sleeve segment is substantially semi-annular.

15. The conveyor of claim 13, wherein said drive member has a longitudinally extending neutral axis and said sleeve segment has longitudinal edges that are welded to the drive member substantially within a plane that includes said longitudinal edges and said neutral axis.

16. The conveyor of claim 14, wherein said drive member has a longitudinally extending neutral axis and said sleeve segment has longitudinal edges that are welded to the drive member substantially within a plane that includes said longitudinal edges and said neutral axis.

17. The conveyor of claim 1, comprising a sleeve segment substantially concentric with the drive member, said sleeve segment having longitudinal edges that are welded to the drive member at locations on opposite sides of the drive member, and having opposite ends that constitute said abutment surfaces.

18. The conveyor of claim 17, wherein said drive member is cylindrical and said sleeve segment is substantially semi-annular.

19. The conveyor of claim 18, wherein the inside surface portions of the upper clamp parts and the abutment surfaces both lean inwardly, and wherein the longitudinal distance between the abutment surfaces is slightly larger than the longitudinal distance between the inside surface portions of the upper clamp parts, whereby movement of the drive member and the drive beam together, to move the abutment surfaces on the drive member into positions contiguous the inside surface portions of the upper clamp parts, spreads apart the upper clamp parts.

20. The conveyor of claim 19, wherein the drive beam is a lip channel having coplanar lips that face the drive member and a space formed by and between the lips, wherein the upper clamp parts are secured to the lips of the drive member, and wherein movement of the abutment surfaces into positions contiguous inside surface portions of the upper clamp parts causes a slight widening of the space between the lips to accommodate the distance between the abutment surfaces.

* * * * *

UNITED STATES PATENT AND TRADEMARK OFFICE
CERTIFICATE OF CORRECTION

PATENT NO. : 5,996,774

DATED : December 7, 1999

INVENTOR(S) : Raymond Keith Foster

It is certified that error appears in the above-identified patent and that said Letters Patent is hereby corrected as shown below:

Claim 5, column 7, line 33, "connector of claim 1" should be --conveyor of claim 1--.

Signed and Sealed this

Twenty-seventh Day of March, 2001

Attest:

NICHOLAS P. GODICI

Attesting Officer      Acting Director of the United States Patent and Trademark Office